United States Patent
Gralki et al.

(12)

(10) Patent No.: US 11,788,624 B2
(45) Date of Patent: Oct. 17, 2023

(54) HIGH-TEMPERATURE SEAL HAVING A CLAMPING PROFILE

(71) Applicant: Siemens Energy Global GmbH & Co. KG, Bayern (DE)

(72) Inventors: Matthias Gralki, Mulheim an der Ruhr (DE); Claus Krusch, Essen (DE); Daniel Schmidt, Mülheim an der Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/642,863

(22) PCT Filed: Jun. 18, 2020

(86) PCT No.: PCT/EP2020/066847
§ 371 (c)(1),
(2) Date: Mar. 14, 2022

(87) PCT Pub. No.: WO2021/063552
PCT Pub. Date: Apr. 8, 2021

(65) Prior Publication Data
US 2022/0390014 A1    Dec. 8, 2022

(30) Foreign Application Priority Data

Oct. 2, 2019 (EP) .................................. 19201100

(51) Int. Cl.
*F16J 15/08* (2006.01)
*F01D 9/02* (2006.01)
*F01D 11/00* (2006.01)

(52) U.S. Cl.
CPC .......... *F16J 15/0887* (2013.01); *F01D 9/023* (2013.01); *F01D 11/003* (2013.01); *F05D 2240/55* (2013.01)

(58) Field of Classification Search
CPC ........ F16J 15/08; F16J 15/0887; F01D 9/023; F01D 11/003; F05D 2240/55
See application file for complete search history.

(56) References Cited

U.S. PATENT DOCUMENTS 7,090,224 B2 * 8/2006 Iguchi ................... F01D 11/005
277/637
8,118,549 B2 * 2/2012 Schiavo ................ F01D 25/243
415/182.1
(Continued)

FOREIGN PATENT DOCUMENTS

| EP | 3023599 A1 | 5/2016 |
| EP | 3045783 A1 | 7/2016 |
| FR | 3055663 A1 | 3/2018 |

OTHER PUBLICATIONS

PCT International Search Report and Written Opinion of International Searching Authority dated Sep. 29, 2020 corresponding to PCT International Application No. PCT/EP2020/066847 filed Jun. 18, 2020.

*Primary Examiner* — Gilbert Y Lee
(74) *Attorney, Agent, or Firm* — WOLTER VAN DYKE DAVIS, PLLC

(57) ABSTRACT

A seal for sealing a gap in a combustion arrangement of a gas turbine. The seal is formed by a L-shaped angle profile and a clamping profile. Both profiles have on the opposite side an engagement flank for fastening in a sealing groove and a sealing flank bearing against one another. The clamping profile further includes a holding portion, which is located opposite the associated sealing flank and also bears against the sealing flank of the angle profile, and a clamping portion connecting the sealing flank to the holding portion.

12 Claims, 2 Drawing Sheets

(56) References Cited

U.S. PATENT DOCUMENTS

| | | | | |
|---|---|---|---|---|
| 8,511,972 B2* | 8/2013 | Sutcu | ................... | F01D 11/005 |
| | | | | 415/139 |
| 8,985,592 B2* | 3/2015 | Green | ................... | F01D 9/023 |
| | | | | 277/637 |
| 2016/0115809 A1 | 4/2016 | Davis et al. | | |
| 2016/0208632 A1 | 7/2016 | Davis et al. | | |
| 2018/0106159 A1 | 4/2018 | Davis et al. | | |

* cited by examiner

HIGH-TEMPERATURE SEAL HAVING A CLAMPING PROFILE

CROSS REFERENCE TO RELATED APPLICATIONS

This application is the US National Stage of International Application No. PCT/EP2020/066847 filed 18 Jun. 2020, and claims the benefit thereof. The International Application claims the benefit of European Application No. EP19201100 filed 2 Oct. 2019. All of the applications are incorporated by reference herein in their entirety.

FIELD OF INVENTION

The invention relates to a seal for sealing a gap between two components of a combustion arrangement in a gas turbine.

BACKGROUND OF INVENTION

The high temperatures and displacements occurring during the operation of the gas turbine of mutually adjacent components and the repeatedly occurring vibrations are a particular challenge for a corresponding seal.

For this purpose, various embodiments of seals, frequently also referred to as "side-seal", are known from the prior art and are used for sealing a gap between the flanges of two adjacent hot gas channels. The hot gas channels each have an opposite sealing groove in the flange, in which sealing grooves the seal engages. For this purpose, the seal is frequently composed of a flat metal strip which, by means of various measures, is intended firstly to remain in position and secondly to cushion the vibrations which occur. For this purpose, embodiments are known in which flat steel is coated with a metal mesh. On the other hand, embodiments are known in which the flat steel is profiled or corrugated.

Despite all endeavors to achieve as long a service life as possible, the seal continues to be a wearing part and sometimes determines the interval for necessary maintenance of the combustion arrangement.

SUMMARY OF INVENTION

It is therefore an object of the present invention to develop a seal with a longer service life for use in a combustion arrangement.

The stated object is achieved by an embodiment according to the invention of a seal according to the teaching of the claims. A combustion arrangement according to the invention is indicated in the claims. Advantageous embodiments are the subject matter of the dependent claims.

The seal of the type in question is firstly used for sealing a gap in a high-temperature application. In this connection, the seal is particularly suitable for use in a combustion arrangement of a gas turbine. The seal has a hot side and an opposite cold side. Upon corresponding application in a combustion arrangement, the operating temperature on the hot side is correspondingly higher than on the cold side. Furthermore, the seal has a left side and a right side.

The novel seal is characterized by a two-part embodiment with an angle profile and a clamping profile which is fastened to the latter, both profiles extending as a seal along the gap.

The angle profile here has an L-shaped configuration. A left engagement flank extends here from the left angle corner of the angle profile to the left side. Conventionally, the left engagement flank engages in a left sealing groove next to the gap. Furthermore, the angle profile has, extending substantially transversely to the left engagement flank, a left sealing flank. The sealing flank extends here from the left angle corner to the cold side.

The clamping profile initially has an analogous shaping with a right engagement flank which extends from a right angle corner to the right side. The right engagement flank analogously engages conventionally here in a right sealing groove opposite the right sealing groove. The clamping profile likewise has a right sealing flank which extends from the right angle corner in the direction of the cold side and lies here flat against the left sealing flank. Furthermore, the clamping profile has a holding portion which, opposite the right sealing flank, likewise lies against the left sealing flank. The left sealing flank is clamped here between the holding portion and the right sealing flank. The connection of the right sealing flank to the holding portion and correspondingly the clamping action is brought about by a clamping portion. The clamping portion is obviously located on the cold side.

The newly created embodiment provides better adaptation to the positions of the opposite sealing grooves, in particular during a change in the position as operation is proceeding. This has the result that—in particular because of the additional degree of freedom—a smaller amount of deformation of the seal occurs and, by this means, in turn, there is less damage due to vibrations at the high temperatures.

In respect of the configuration of the seal with the angle profile and the clamping profile, it is advantageous if the width of the left sealing flank, as measured in the direction from the hot side to the cold side, is greater than the width of the right sealing flank. It is likewise advantageous if the width of the left sealing flank is likewise greater than the width of the holding portion.

Furthermore, it is advantageous if the width of the right sealing flank is greater than the width of the left engagement portion, the width of which is measured from the left side to the right side. It is likewise advantageous if the width of the holding portion is greater than the width of the left engagement portion. This applies analogously to the right engagement portion, the width of which is advantageously smaller than the width of the right sealing flank and the width of the holding portion.

Taking into account the desired clamping action by means of the clamping portion and the construction space limitations that are frequently encountered, it is furthermore advantageous if the breadth of the clamping portion, as measured in the direction from the left side to the right side, is at least 1.5 times and at most 3.5 times the total of the thickness of the left sealing flank plus the thickness of the right sealing flank. It is particularly advantageous in this case if the breadth of the clamping portion is at least 2 times the thickness of the two sealing flanks. Furthermore, it is particularly advantageous if the breadth of the clamping portion is at most 3 times the thickness of the two sealing flanks.

An advantageous configuration of the holding portion is provided if the latter has a portion of greater thickness on the cold side and a portion of lesser thickness on the hot side. The two individual portions here have a width, as considered in a direction from the hot side to the cold side, of at least 0.3 times the width of the holding portion. The flexural rigidity of the portion of greater thickness here is at least 2 times the flexural rigidity of the portion of lesser thickness.

In a first simple embodiment, the clamping portion can be designed extending along the gap or the seal. However, it is advantageous if the clamping portion is repeatedly interrupted along the gap and therefore has a plurality of clamping sections with a clearance in between.

In particular in respect of the configuration and manufacturing of the sealing grooves, it is advantageous if the thickness of the left engagement flank corresponds to the thickness of the right engagement flank. Furthermore, it is advantageous, in order to obtain a long service life, if the left sealing flank has a thickness corresponding to the right sealing flank.

In respect of the production, it is furthermore advantageous if the thickness of the left engagement flank corresponds to the thickness of the left sealing flank. It is analogously advantageous if the thickness of the right engagement flank corresponds to the thickness of the right sealing flank. For this purpose, it is furthermore advantageous if the thickness of the clamping portion corresponds to the thickness of the right sealing flank. Furthermore, it is advantageous if the portion of greater thickness of the holding portion has a thickness corresponding to the clamping portion.

Proceeding from the novel seal according to the invention, the formation of a combustion arrangement according to the invention is made possible. The latter here has at least one left hot gas channel and one right hot gas channel. The two hot gas channels are arranged adjacent to each other and are each used for conducting a hot combustion gas. The gap located between the adjacent hot gas channels is sealed by means of a seal as described previously. For this purpose, the hot gas channels each have an opposite sealing groove. The left engagement portion accordingly engages in the left sealing groove and the right engagement portion engages in the right sealing groove.

It is advantageous here if the distance from the groove base of the right sealing groove as far as the groove base of the left sealing groove is at least 1.1 times and at most 1.5 times the width of the seal.

It is furthermore advantageous if the breadth of the left and of the right sealing groove corresponds to at least 1.05 times and at maximum to 1.2 times the thickness of the left engagement flank and of the right engagement flank, respectively.

BRIEF DESCRIPTION OF THE DRAWINGS

An exemplary embodiment of a seal according to the invention and of a combustion arrangement is depicted in the following figures, in which.

DETAILED DESCRIPTION OF INVENTION

Figure 1:
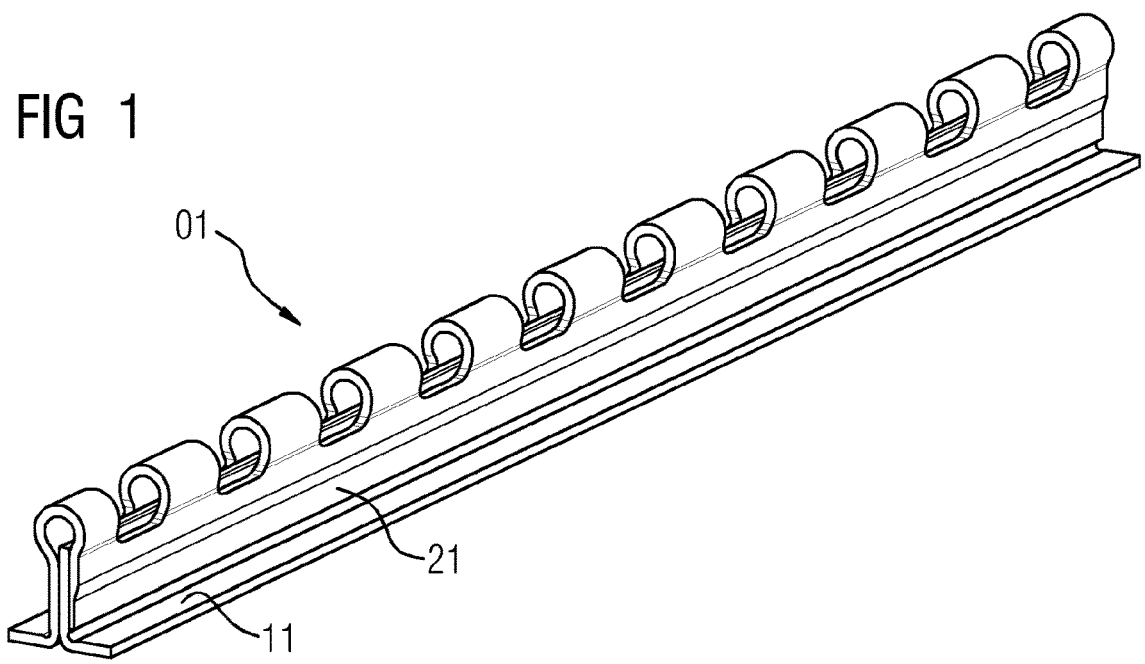
FIG. 1 shows a perspective arrangement of an exemplary embodiment of a seal.

FIG. 1 depicts an exemplary embodiment of a seal 01 which is formed by an angle profile 11 and a clamping profile 21.

Figure 2:
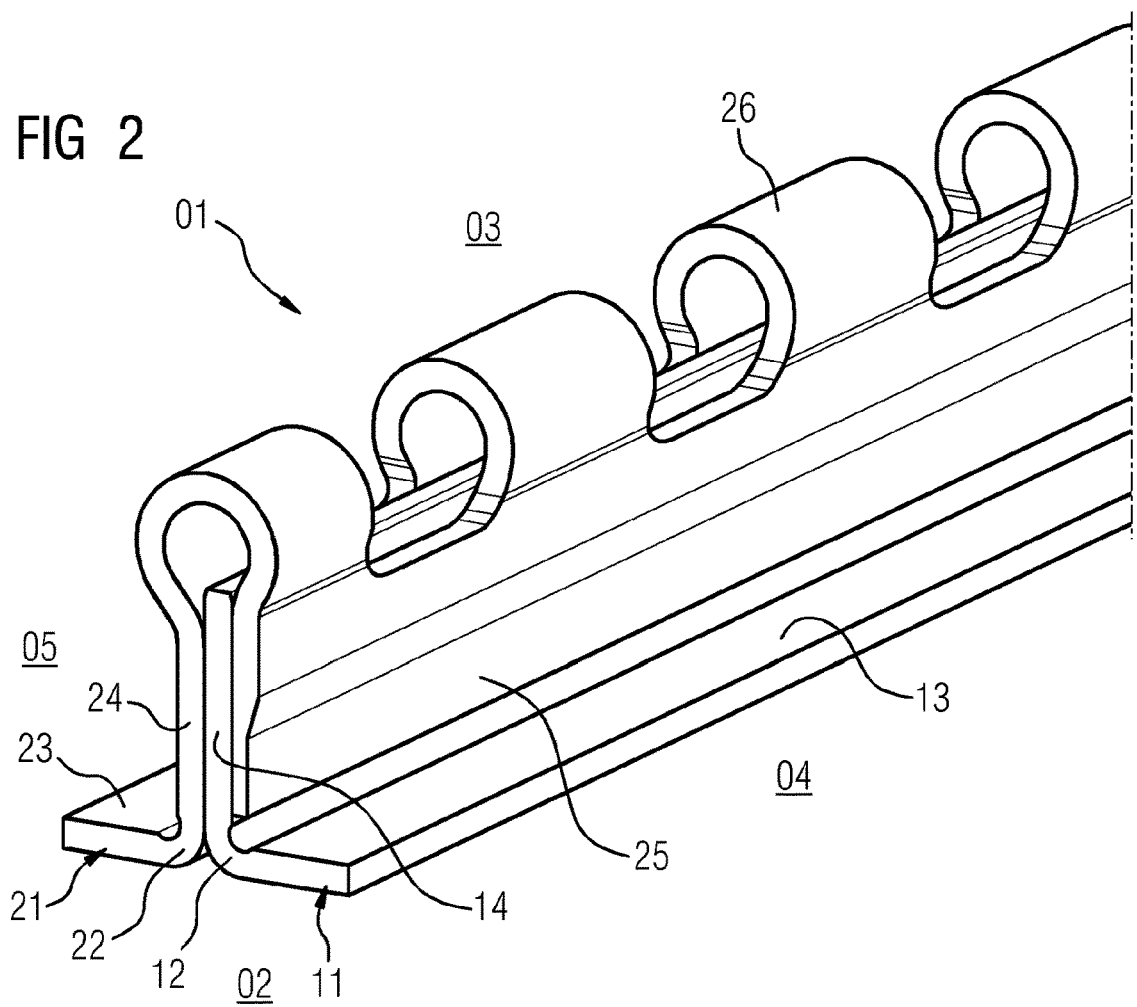
FIG. 2 shows a detailed view of FIG. 1.

For this purpose, FIG. 2 shows in detail the end of the seal 01 from FIG. 1. The angle profile 11, which 11—as is apparent—has an L-shaped configuration can firstly be seen on the right side. A left engagement flank 13 extends here from the left angle corner 12 to a left side 04. Furthermore, a left sealing flank 14 extends from the left angle corner 12 to a cold side 03. The hot side 02 is located opposite the cold side 03 and the right side 05 is located opposite the left side 04. For the advantageous production of the angle profile 11, the left engagement flank 13 has the same material thickness as the left sealing flank 14.

The second component of the seal 01 is formed by the clamping profile 21. The profile 21 analogously comprises a right engagement flank 23, which engagement flank 23 extends from a right angle corner 22 to the right side 05. Furthermore, a right sealing flank 24 analogously extends from the right angle corner 22 to the cold side 03. The right sealing flank 24 lies here flat against the left sealing flank 14. For the advantageous production, the right sealing flank 24 likewise has the same material thickness as the right engagement flank 23.

A holding portion 25 is located opposite the right sealing flank 24 in a manner likewise bearing against the left sealing flank 14. The holding portion 25 here in turn comprises a portion of greater thickness lying on the cold side 03 and a portion of lesser thickness lying on the hot side 02.

The holding portion 25 is connected to the right sealing flank 24 by means of a clamping portion 26. The clamping portion 26 is obviously located here on the cold side 03 and has a curved configuration. As can be seen, it is provided that the clamping portion 26 is not formed continuously, but rather is divided into a plurality of clamping sections which are each separated from one another by a clearance. It can furthermore be seen that the clamping portion 26 has the same material thickness as the right sealing flank 24 and the same material thickness as the portion of greater thickness of the holding portion 25.

Figure 3:
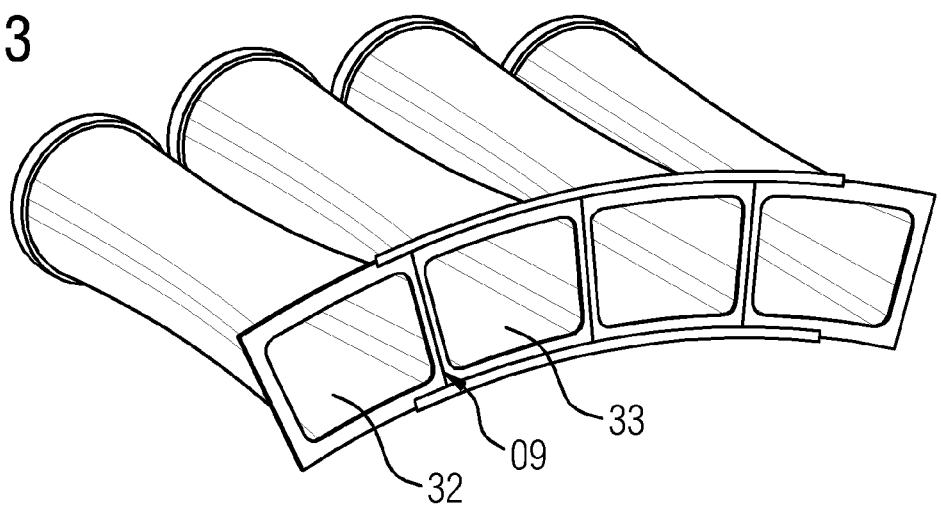
FIG. 3 shows a combustion arrangement for use of the seal from FIG. 1.

FIG. 3 depicts by way of example a portion of a combustion arrangement which comprises a left flame tube 32 and a right flame tube 33. Said flame tubes 32, 33 are arranged adjacent to each other here and, between an adjacent flange, form a gap 09, which gap 09 should be sealed.

Figure 4:
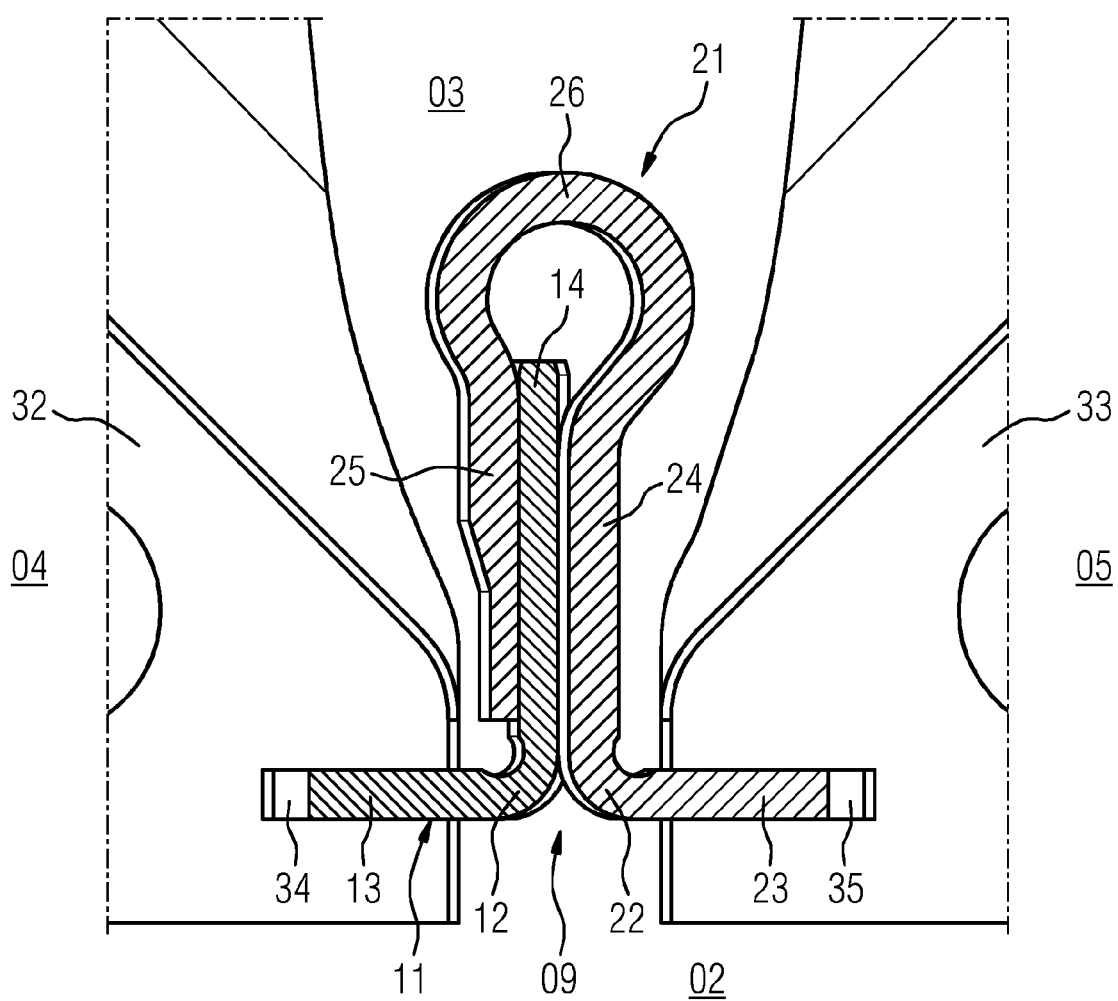
FIG. 4 shows a cross section through the combustion arrangement with the seal from FIG. 1.

For this purpose, FIG. 4 depicts, in cross section, the arrangement of the seal 01 in the gap 09 between the flame tubes 32, 33. The angle profile 11 with the left engagement surface 13 and the left sealing flank 14 can in turn be seen. It can furthermore be seen that the left engagement flank 13 is received in a left sealing groove 34 of the left flame tube 32. Analogously, the clamping profile 21 has the right engagement flank 23, which engagement flank 23 engages in a right sealing groove 35 of the right flame tube 33. The right sealing flank 24 lies here flat against the left sealing flank 14. The clamping portion 26 of curved configuration adjoins the right sealing flank 24 and produces the connection to the holding portion 25, which holding portion 25 lies on the left sealing flank 14 opposite the right sealing flank 24.

Therefore, firstly, the sealing between the left engagement flank 13 and the left flame tube 32 with the left sealing groove 34 is provided, and the sealing between the right engagement flank 23 and the right flame tube 33 with the right sealing groove 35 is analogously provided, and, secondly, the sealing with the right sealing flank 24 and the left sealing flank 14 is provided.

The invention claimed is:

1. A seal for sealing a gap in a high-temperature application, having a hot side and an opposite cold side, and a left side and an opposite right side, comprising:
    an angle profile having an L-shaped configuration with a left engagement flank extending from a left angle corner to the left side and with a left sealing flank extending from the left angle corner to the cold side; and a clamping profile with a right engagement flank extending from a right angle corner to the right side and with a right sealing flank extending from the right angle corner to the cold side and lying against the left sealing flank, and with a holding portion lying against the left sealing flank opposite the right sealing flank, and with a curved clamping portion connecting the right sealing flank to the holding portion.

2. The seal as claimed in claim 1,
wherein: a width of the left sealing flank as measured from the hot side to the cold side is greater than a width of the right sealing flank as measured from the hot side to the cold side and a width of the holding portion as measured from the hot side to the cold side; and/or
wherein the width of the right sealing flank as measured from the hot side to the cold side and the width of the holding portion as measured from the hot side to the cold side are greater than a width of the left engagement flank as measured from the left side to the right side and a width of the right engagement flank as measured from the left side to the right side.

3. The seal as claimed in claim 1,
wherein the breadth of the clamping portion is at least 1.5 times, and at most 3.5 times, the thickness of the left sealing flank plus the thickness of the right sealing flank.

4. The seal as claimed in claim 3,
wherein the breadth of the clamping portion is at least 2 times the thickness of the left sealing flank plus the thickness of the right sealing flank.

5. The seal as claimed in claim 3,
wherein the breadth of the clamping portion is at most 3 times the thickness of the left sealing flank plus the thickness of the right sealing flank.

6. The seal as claimed in claim 1,
wherein the holding portion has a thicker portion of greater thickness and a thinner portion of lesser thickness,
wherein the thicker portion and the thinner portion each have a width as measured from the hot side to the cold side of at least 0.3 times a width of the holding portion as measured from the hot side to the cold side, and
wherein a flexural rigidity of the thicker portion is at least 2 times the flexural rigidity of the thinner portion.

7. The seal as claimed in claim 1,
wherein the clamping portion is divided along the gap into a plurality of clamping sections with a clearance in each case in between.

8. The seal as claimed in claim 1,
wherein the thickness of the left engagement flank corresponds to the thickness of the right engagement flank; and/or
wherein the thickness of the left sealing flank corresponds to the thickness of the right sealing flank; and/or
wherein the thickness of the clamping portion corresponds to the thickness of the right sealing flank; and/or
wherein the thickness of the thicker portion of the holding portion corresponds to the thickness of the clamping portion.

9. A combustion arrangement, comprising:
a left hot gas channel and a right hot gas channel, which hot gas channels each conduct a hot combustion gas,
wherein the hot gas channels are arranged adjacent to each other with a gap in between and have a right and a left sealing groove, respectively, opposite each other,
wherein a seal as claimed in claim 1 is arranged in the gap, said seal engaging in the opposite sealing grooves.

10. The combustion arrangement as claimed in claim 9,
wherein the distance between opposite groove bases of the sealing grooves is at least 1.1 times and at most 1.5 times the width of the seal.

11. The combustion arrangement as claimed in claim 9,
wherein the breadth of the left sealing groove and the right sealing groove is at least 1.05 times and at maximum 1.2 times the thickness of the left engagement flank and of the right engagement flank, respectively.

12. The seal as claimed in claim 1,
wherein the high-temperature application comprises a combustion arrangement of a gas turbine.

\* \* \* \* \*